INVENTOR
BO N. HOFFSTROM

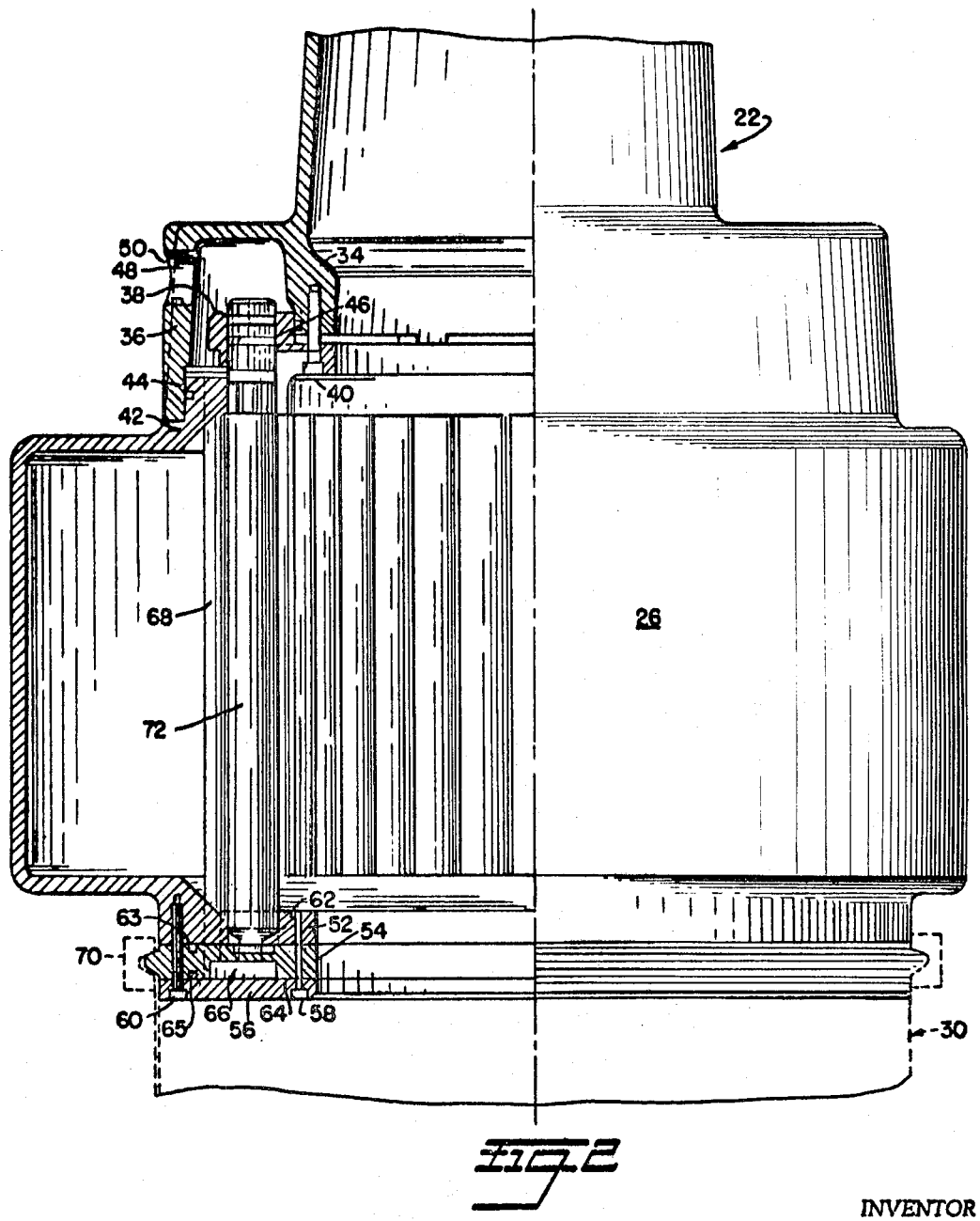

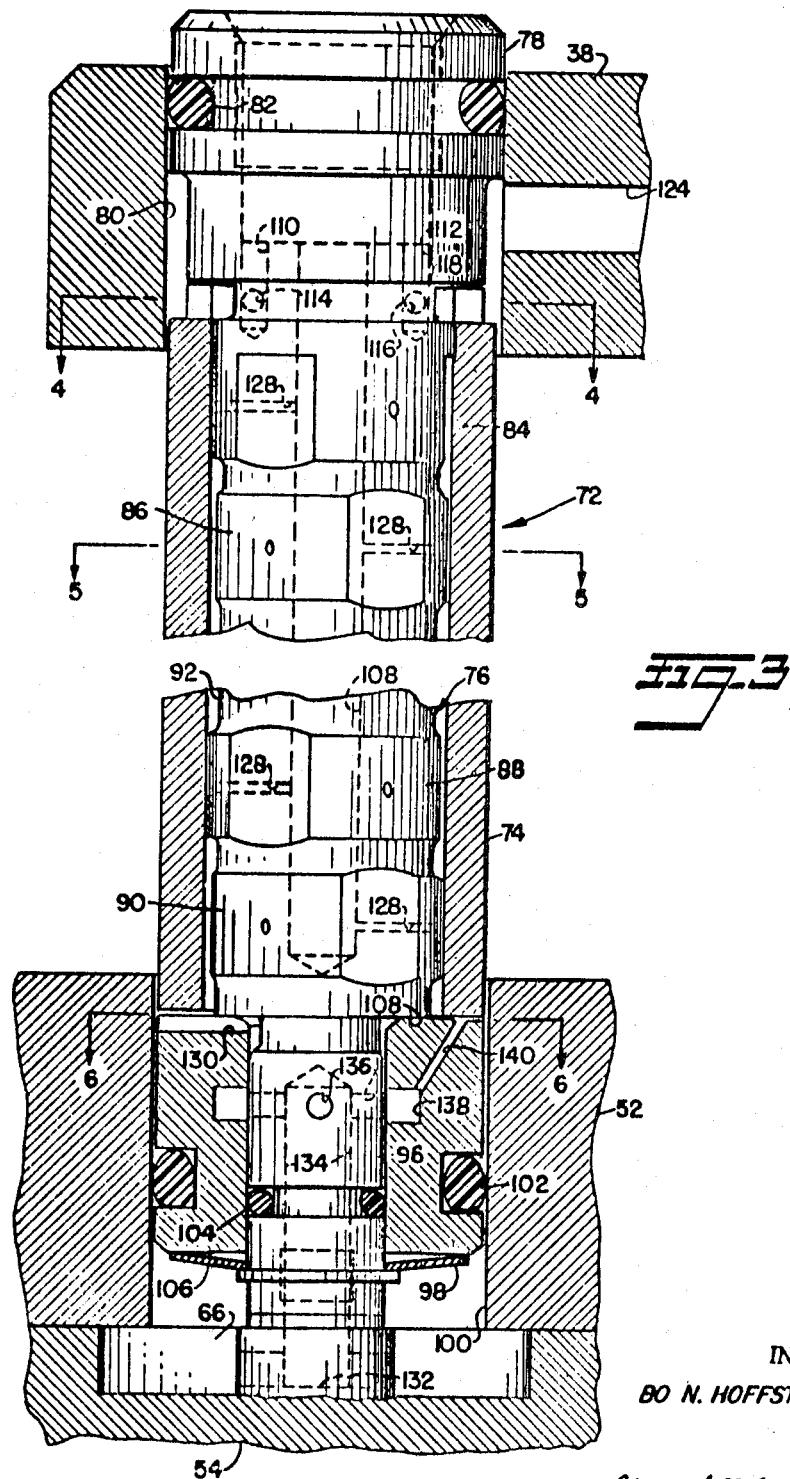

Dec. 14, 1971  BO N. HOFFSTROM  3,626,664
METHOD OF SEPARATING PARTICLES FROM A FLUID
Original Filed May 28, 1965  4 Sheets-Sheet 4

INVENTOR
BO N. HOFFSTROM

BY Strauch, Nolan, Neale,
Nies and Bronaugh
ATTORNEYS

United States Patent Office 3,626,664
Patented Dec. 14, 1971

3,626,664
METHOD OF SEPARATING PARTICLES FROM A FLUID
Bo Nilsson Hoffstrom, deceased, late of Santa Monica, Calif., by Maruja Hoffstrom, administratrix, Santa Monica, Calif., assignor to McDonnell Douglass Corporation, Santa Monica, Calif.
Continuation of application Ser. No. 459,704, May 28, 1965. This application Apr. 1, 1969, Ser. No. 837,001
Int. Cl. B01d 37/00, 45/00
U.S. Cl. 55—1
2 Claims

ABSTRACT OF THE DISCLOSURE

Method and apparatus for separating two fluids or separating oversize particles from a fluid in which they are entrained. The fluid to be treated is passed through narrow passages formed between members which are rotated in the same direction at sufficiently high speed to create oppositely moving boundary layers at the sides of each passage, the boundary layer at one side of said passage entraining oversize particles or the fluid to prevent the travel of the fluid or oversize particles through the passages.

CROSS-REFERENCE TO RELATED APPLICATION

This application is a continuation of co-pending application Ser. No. 459,704 filed on May 28, 1965 now abandoned by Bo N. Hoffstrom for separators.

BACKGROUND OF THE INVENTION

This invention relates to separator apparatus for removing oversize particles from fluid streams or separating one fluid from another and more particularly to such apparatus incorporating a series of bars or rods forming a grid through which the fluid is passed.

Many types of grid cleaners or separators have been proposed in the past. One particularly efficient unit of this type is disclosed and claimed in U.S. Pat. 3,140,937, owned by applicant's assignee.

In general, successful operation of such apparatus is dependent upon the establishment of local fields of centrifugal force to which the fluid is subjected as it passes through the apparatus. At present the primary application of such apparatus is the removal of particles from a particle laden stream. Particles above a predetermined size, referred to herein as oversize particles, are moved by the centrifugal force out of one portion of the stream into another portion of the stream. The two portions of the stream are then separated and delivered separately from the apparatus.

In all known prior grid type cleaners the separating forces are developed by passing the fluid stream to be treated over the surface of the grid, the individual elements of the grid being so shaped and spaced as to create the centrifugal field and to divide the streams into the particle free and particle carrying portions. The effectiveness of cleaners of this type is dependent upon the strength of the centrifugal field established which is in turn a function of the relative speed of the grid rods and the stream to be treated. The relative speed of the stream and the grid to effect separation of very small particles is so large as to impose a practical limitation on the minimum size of particles which can be removed from the air stream.

Effective control of boundary layer phenomenon has also proved to be troublesome in prior grid type separators. Particles entrained in a boundary layer will move with the boundary layer, often with the result that particles are moved into the portion of the fluid stream which is intended to be particle free.

With the foregoing considerations in mind it is the principal purpose and object of the present invention to provide improved grid type cleaners which overcome these and other problems by the provision of unique grid members, preferably cylindrical rods, which are rotated at high speed to create the necessary local centrifugal field and to establish controlled boundary layers which are utilized positively to effect the cleaning and separating action.

It is a further object of the present invention to provide improved grid cleaners having an efficiency much higher than that obtainable in prior cleaners.

It is also an object of the present invention to provide improved grid type cleaners which are completely self cleaning and which, because of unique boundary layer phenomena established in the grid members, are not subject to abrasive action of the particles in the fluid being treated and which are thus subjected to substantially no wear in operation.

Additional objects and advantages of the present invention will become apparent as the description proceeds in connection with the accompanying drawings in which:

FIG. 3 is an enlarged fragmentary section showing details of construction of the individual grid rods and their mounting;

Figure 4:
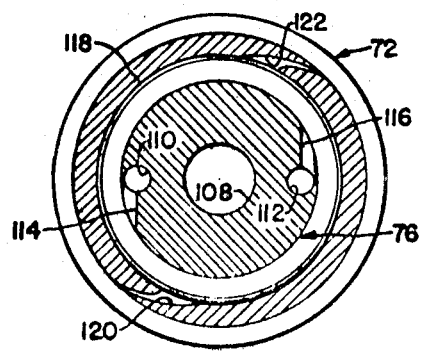
Figure 5:
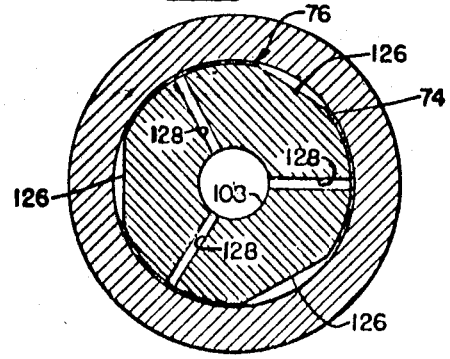
Figure 6:
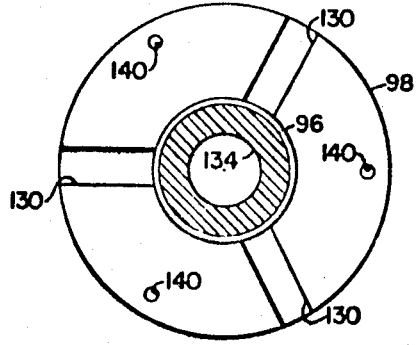

FIGS. 4, 5 and 6 are transverse sections taken respectively on lines 4—4, 5—5 and 6—6 of FIG. 3; and FIG. 7 is an enlarged fragmentary section illustrating diagrammatically the separating action effected by the apparatus of the present invention.

Figure 1:
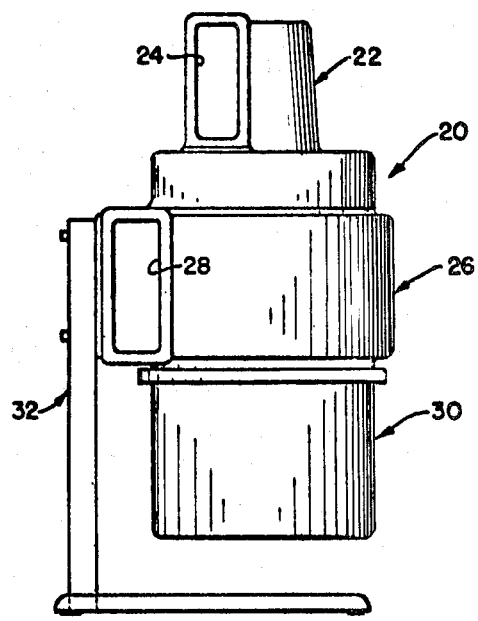
FIG. 1 is a side elevation of an air cleaner incorporating the present invention.
Figure 2:
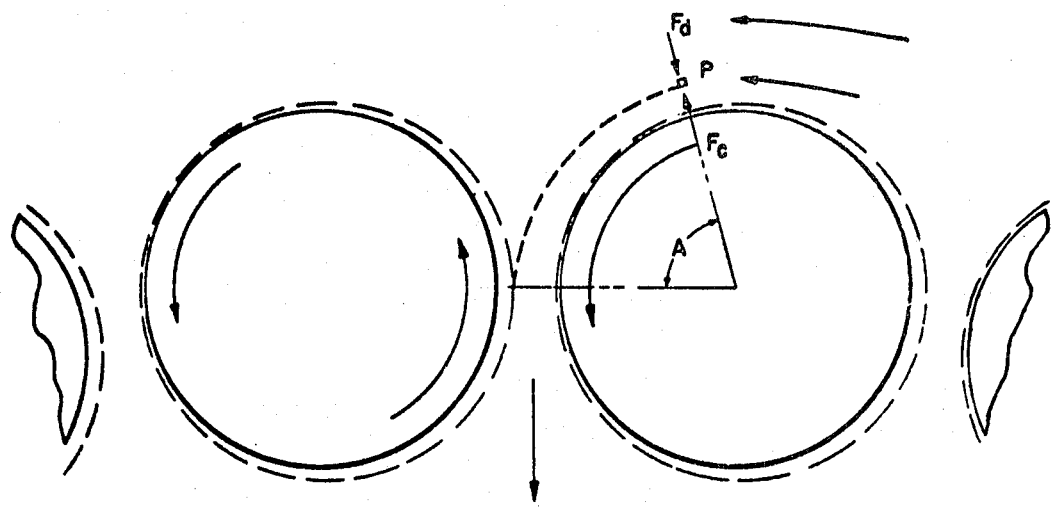
FIG. 2 is an enlarged fragmentary vertical section illustrating the cleaner of the present invention.

Referring now more particularly to the drawings the cleaner apparatus of the present invention, indicated generally at 20 in FIG. 1, is of generally vertically elongated cylindrical construction and comprises an upper housing member 22 having an inlet air opening 24, an intermediate housing member 26 having an air outlet opening 28, and a lower removable receptacle 30 in which the impurities removed from the air stream are collected. Conveniently, the entire apparatus is mounted on a stand assembly 32.

The upper housing member 22 has a pair of downwardly projecting flanges 34 and 36 which telescope over the inner and outer surfaces, respectively, of the grid rod mounting section 38 of the intermediate housing member 26. The parts are held in assembled relation with the bottom edge of the flange 36 in contact with an annular supporting surface on the intermediate housing 26 by a plurality of screws 40, the parts being sealed by O-rings 42, 44 and 46, to form an annular manifold 48 having an air inlet opening 50 adapted for connection to a source of air under pressure.

At its lower end intermediate housing member 26 terminates in an inwardly projecting mounting flange 52 to which an intermediate ring 54 and a bottom cover 56 are secured by inner and outer sets of screws 58 and 60. These parts are sealed by O-rings 62, 63, 64 and 65 to form a lower annular manifold 66. The upper and lower manifolds 48 and 66 are connected by one or more air transfer pipes 68.

The particle receptacle 30 is detachably secured in place by a clamp ring 70 secured to the outer periphery of the ring 54.

From the structure thus far described it will be apparent that the air cleaner is of essentially hollow construction to permit free passage of the air from the inlet 24 to the outlet 28. Interposed in the path of the air is the cleaner structure per se which comprises a series of parallel rod assemblies 72 which are preferably arranged in the form of a circular grid so that all of the air flowing from the inlet 24 to the outlet 28 must pass through the relatively narrow spaces between the individual grid rods.

As best shown in FIG. 3 the individual grid rod assemblies 72 comprise rotatable tubular cylindrical rod members 74 and fixed internal support members 76. The support members 76 each include a top mounting head 78 received with a close clearance fit in a bore 80 in the mounting section 38 of the intermediate housing member. The head 78 carries an O-ring 82 to seal the parts when they are assembled.

Each member 76 also includes mounting areas 84 and 86 adjacent its upper end and similar mounting areas 88 and 90 adjacent its lower end connected by an elongated cylindrical section 92. The reduced cylindrical lower end portion 96 of the mounting member 76 extends with a close clearance fit into a collar 98 frictionally held in a bore 100 of the ring 52 by an O-ring 102. An O-ring 104 similarly seals the interior of collar 98. A Belleville spring 106 yieldably holds the upper surface of the collar 98 against a shoulder 107 on the mounting member 76.

Preferably, compressed air is used to both drive the rdos 74 and to support the rods for high speed rotation. For this purpose the upper ends of the support members 76 are open to the upper manifold 48 and are each provided with an interior passage 108 extending from the top of the support member to the region adjacent the lower support area 90. The enlarged upper end of the passage 108 communicates with a pair of small vertical drilled passages 110 and 112 which lead to tangential nozzles 114 and 116, respectively (FIG. 4), which in turn lead to an annular air chamber 118 formed by a reduced section of the support member 76. The air exits from the chamber 118 through a pair of opposed nozzles 120 and 122 formed integrally with or secured to the upper end of the rod member 74 producing rotation of the rod member at the desired speed. After passing through the nozzles 120 and 122 the air flows through a plurality of radial passages 124 and joins the main internal air flow.

The bearing sections 84, 86, 88 and 90 are of identical configuration but different orientation. As best shown in FIG. 5, each of these sections is generally cylindrical and is interrupted by three equally spaced flats 126. Three drilled radial passages 128 connect the central air passage 108 with the respective centers of the cylindrical sections of the bearing areas between the flats 126. In operation, the air flowing through the passages 128 provides a thin film of air between the fixed support member 76 and the rod 74 to provide an air bearing to facilitate the high speed rotation of the rod with negligible frictional loss. To achieve the proper air bearing action, the clearance space between the cylindrical portions of the support rod 76 and the interior of the rod 74 is very small. For example, in a typical case, the interior diameter of the rod 74 is .8750 and the diameter of the cylindrical bearing portions of the support rod 76 is .8749. After the air leaves the bearing surfaces it passes axially downwardly and exits from the bottom of the rod 74 principally through a series of radial channels 130 (FIG. 6) formed in the upper surface of collar 98.

Compressed air is also supplied from the lower manifold 66 through a passage 132 into a bore 134 formed in the portion 96 of the support member 76. The air passes from the bore 134 through a plurality of drilled passages 136 into a manifold 138 formed in the collar 98 thence to a plurality of inclined passages 140 (one shown) to the small clearance space provided between the lower end of the rod 74 and the upper flat surface of the collar 98 to provide an air thrust bearing at this point.

In a typical case the individual rods will rotate at a high speed, i.e., 50,000 r.p.m.–100,000 r.p.m. although somewhat higher or lower speeds may be used in some installations. This rotation may be obtained by the air turbine drive illustrated or by mechanical drives including belts, gears and the like. Also, the rods are preferably driven at essentially the same speed. In the specific example illustrated the diameter of the rods 74 is about ⅞". Accordingly, if the rods are rotated at 75,000 r.p.m. the surface speed of the rods is over 17,000 feet/minute. In apparatus having these dimensions and speed, the spacing between adjacent portions of the rods (which has been exaggerated in FIG. 7) will be in the neighborhood of .040 inch.

When the cleaner is in operation, a stream of particle laden air is established, either by the rotation of the grid rods or by an external source of air under pressure, which flows circumferentially of the grid structure and radially outwardly through the spaces between the adjacent grid rods 74. In a typical case the air stream flows at a rate of 1200 c.f.m. and carries particles of one to four microns in size. The particles entrained in the air stream will approach the inner surface of the grid and will be subjected to the unique action of the grid rods which will now be described in detail with reference to FIG. 7.

As the rods rotate, a boundary layer of varying thickness is established over the surface of their cylindrical body portions, the boundary layer varying in thickness as a function of the difference in the surface speed of the rods and the speed of the surrounding air. The term "boundary layer" as used herein refers to the body of fluid set in motion by the rotation of the rods. As is well known the velocity of this body of fluid varies as an inverse function of the distance from the surface of the rods, reaching a maximum which is essentially the same as the surface speed of the rods. In the embodiment shown, the boundary layer will assume a configuration illustrated by the shaded area $b$ in FIG. 7, i.e., the boundary layer will be relatively thin or non-existent in the region in which the air stream is moving in the same direction as the surface of the rods and will be relatively thick in the region where the rods and the air streams are moving in opposite directions. The exact thickness and distribution of the boundary layer is susceptible of close calculation in a specific case.

Preferably the apparatus is operated by connecting the inlet 24 to a source of particle laden fluid under pressure. A pressurized fluid source, however, is not necessary since the grid rods, when rotated at high speed, have sufficient pumping action to move fluid through the apparatus. In either event the fluid within the unit will be caused to flow in a rotary path either by the operation of the rods alone or by the combined action of the rods and the supply of fluid under pressure tangentially through the inlet opening 24.

All of the particles will follow a downwardly spiralling path with the larger particles moving downwardly more rapidly than the smaller particles. Large particles fall rapidly into the collector 30. The smaller particles will be caused by the centrifugal force and the outward flow of fluid through the apparatus to approach the inner surface of the grid formed by the rods. When the particles reach the individual rods they are accelerated by the boundary layer surrounding each rod to a speed which is essentially the same as the surface speed of the rods and are thus subjected to the action of the strong local centrifugal field established by each of the rapidly rotating rods. Accordngly, the particles are moved toward the throats formed between the adjacent rods. However, to pass through these spaces the particles must travel a radial distance less than the distance between the surface of one rod and the boundary layer at the surface of the next adjacent rod while the particle moves through the Angle A (FIG. 7). Any oversize particles which traverse a greater distance will be caught by the inwardly moving boundary layer of the next adjacent rod and returned to the air stream circulating within the grid structure. The actual path followed by a given particle will be determined principally by the centrifugal force $F_c$ exerted on the particle P which is primarily a function of the mass of the particle and its angular velocity which, in turn, is determined by the rotary speed of the rods. As the particle moves radially along the path shown diagrammatically in FIG. 7 its movement will be opposed by a radially acting air drag force $F_d$. However, this force is small as compared to the opposing centrifugal force and it may be ignored except for exceedingly small particles. Accordingly, by rotating the rods to obtain a high surface speed and by spacing them relatively closely together, particles of even very small size are given sufficient radial velocity to cause them to pass into the boundary layer of the next associated rod for return to the main air stream at the inside of the grid where they continue their downward spiralling movement and pass ultimately into the container 30. Thus, the cleaner of the present invention is many times more effective than prior cleaners embodying stationary grid elements.

Because of the high centrifugal field created in the region of the surface of the individual grid rods they are self-cleaning and since all particles are urged away from these surfaces, the surfaces are subjected only to negligible wear in operation.

While, as stated above, the grid members are preferably cylindrical, other configurations may be utilized with good results. For example, the surfaces of the members may be grooved, fluted, or roughened. Any type of grid member may be utilized so long as it effectively produces a high strength local centrifugal field and maintains the spacing between the peripheral surfaces of the adjacent members substantially uniform. Rods having an oval or a square cross section would not be satisfactory since they fail to maintain this uniform spacing between the rods.

The rods may be arranged to provide grids of other forms. For example, the rods may be arranged in a straight line or in the form of an arc which may be circular or non-circular. In cases where the grid is of non-circular form, seals or scrapers must be provided at opposite ends of the grid to prevent leakage in these regions. Regardless of the configuration of the grid, the rods may be rotated in either direction. Also, the direction of the air stream with respect to the grid is immaterial.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of separating particles from a fluid passing from a first zone into a second zone comprising the steps of introducing a fluid stream laden wih particles having a particle size on the order of several microns into said first zone, providing between said zones at least two relatively rotatable parallel essentially cylindrical surfaces spaced apart to define a narrow passage therebetween, the width of said passage being substantially greater than the size of said particles, rotating said surfaces in the same direction at the same high speed, and, during said rotation, flowing said particle laden fluid stream in said first zone in a first direction substantially at a right angle to the longitudinal dimension of said passage, said longitudinal dimension being that extending from the first zone to the second zone, then turning said particle laden fluid stream from said first direction in said zone and flowing said particle laden fluid stream into said passage toward said second zone, creating and maintaining at each surface a moving boundary layer of said fluid by said rotation of said surfaces and said flow of said fluid, moving layer at one side of said passage toward said second zone by said rotation, moving the boundary layer at the other side of said passage toward said first zone by said rotation, moving oversize particles entering said passage laterally across said passage before they traverse the longitudinal dimension of said passage, entraining said oversize particles in said oppositely moving boundary layer at the other side of said passage and returning said oversize particles to said first zone, and passing said fluid, devoid of said oversize particles, from said passage into said second zone.

2. The method according to claim 1 wherein said surfaces are rotated at a speed such that the surface speed thereof is not substantially less than 11,000 feet per minute.

References Cited

UNITED STATES PATENTS

| | | | |
|---|---|---|---|
| 702,583 | 6/1902 | Nightingale | 209—119 |
| 1,325,219 | 12/1919 | Vaughn | 209—151 X |
| 2,448,424 | 8/1948 | Dohrmann. | |
| 3,140,937 | 7/1964 | Hoffstrom | 55—442 |
| 3,219,187 | 11/1965 | Ritze | 209—233 |

FOREIGN PATENTS

| | | |
|---|---|---|
| 303,970 | 1/1929 | Great Britain. |
| 383,885 | 11/1932 | Great Britain. |
| 79,737 | 11/1955 | Neitherlands. |
| 225,992 | 6/1943 | Switzerland. |

DENNIS E. TALBERT, JR., Primary Examiner

U.S. Cl. X.R.

55—17, 406, 429, 460; 209—21, 106, 115, 133, 233

UNITED STATES PATENT OFFICE
CERTIFICATE OF CORRECTION

Patent No. 3,626,664　　　　　　　　Dated　December 14, 1971

Inventor(s)　Bo N. Hoffstrom

It is certified that error appears in the above-identified patent and that said Letters Patent are hereby corrected as shown below:

Column 3, line 23, change "rdos" to --rods--.

Column 6, line 19, after "moving" insert --the boundary--.

Assigned to "McDonnell Douglass Corporation" should be "McDonnell Douglas Corporation"

Signed and sealed this 15th day of August 1972.

(SEAL)
Attest:

EDWARD M. FLETCHER, JR.　　　　　ROBERT GOTTSCHALK
Attesting Officer　　　　　　　　Commissioner of Patents